(12) United States Patent
Natarajan et al.

(10) Patent No.: US 9,565,465 B1
(45) Date of Patent: Feb. 7, 2017

(54) METHOD AND SYSTEM FOR DYNAMICALLY MANAGING STORAGE SPACE OF VIDEO RECORDING DEVICES

(71) Applicant: Wipro Limited, Bangalore (IN)

(72) Inventors: Gowrishankar Subramaniam Natarajan, Chennai (IN); Harish Nair Rajagopal, Trivandrum (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 14/865,323

(22) Filed: Sep. 25, 2015

(30) Foreign Application Priority Data

Jul. 30, 2015 (IN) .......................... 3930/CHE/2015

(51) Int. Cl.
| | |
|---|---|
| *H04N 5/76* | (2006.01) |
| *H04N 21/4335* | (2011.01) |
| *G11B 27/36* | (2006.01) |
| *H04N 21/4147* | (2011.01) |
| *H04N 21/433* | (2011.01) |
| *H04N 21/2747* | (2011.01) |
| *H04N 21/45* | (2011.01) |
| *H04N 5/93* | (2006.01) |
| *G11B 27/00* | (2006.01) |

(52) U.S. Cl.
CPC .......... *H04N 21/4335* (2013.01); *G11B 27/36* (2013.01); *H04N 21/2747* (2013.01); *H04N 21/4147* (2013.01); *H04N 21/4334* (2013.01); *H04N 21/4532* (2013.01)

(58) Field of Classification Search
USPC ................ 386/291, 294, 295, 296, 297, 299
See application file for complete search history.

(56) References Cited

U.S. PATENT DOCUMENTS

| | | | |
|---|---|---|---|
| 2009/0119701 A1* | 5/2009 | Aldrey ..................... | H04N 5/76 725/32 |
| 2010/0020823 A1* | 1/2010 | Bai ..................... | H04L 47/2416 370/468 |
| 2015/0003814 A1* | 1/2015 | Miller ................ | H04N 21/4583 386/297 |

* cited by examiner

*Primary Examiner* — Daquan Zhao
(74) *Attorney, Agent, or Firm* — LeClairRyan, a Professional Corporation

(57) ABSTRACT

The technology relates to dynamically managing storage space of one or more video recording devices. The video recording devices sends one or more notifications to recording session management server. The one or more notifications are associated with recording status of an event and the storage space status of each of the one or more video recording devices. Each device is associated with one or more predefined policies configured by a user of the video recording devices. Based on predefined policies and notifications, the recording session management server identifies change in status of free space and used space in each of the one or more video recording devices. The recording session management server schedules video recording devices to perform actions based on change in status of free space and used space and one or more event parameters for dynamically managing the storage space of the one or more video recording devices.

15 Claims, 5 Drawing Sheets

METHOD AND SYSTEM FOR DYNAMICALLY MANAGING STORAGE SPACE OF VIDEO RECORDING DEVICES

This application claims the benefit of Indian Patent Application Serial No. 3930/CHE/2015 filed Jul. 30, 2015, which is hereby incorporated by reference in its entirety.

TECHNICAL FIELD

The present subject matter is related, in general to video recording devices, and more particularly, to a method and system for dynamically managing storage space of video recording devices.

BACKGROUND

Generally, a Digital Video Recorder (DVR) or a Personal Video Recorder (PVR) is used to record television programs. These devices have capacity to store 100s of hours of media in standard formats on secure hard disks in the device itself. There can be multiple such devices at home for example one in living room and one in bed room. Recently, there has been a shift to having cloud based recordings (cloud DVR) for television content which is then streamed to a Set Top Box (STB) or other mobile devices that the user owns. In view of the above, there exists a problem for managing the storage of recordings optimally across multiple recording devices at home and cloud.

The existing recording systems schedule and record programs either locally on a Hard Disk Drive (HDD) of a user specified/user owned Customer Premise Equipment (CPE) device or on the network storage in the cloud based on user request for recording initiation. Each user or account may be given an allocation of storage capacity in these storage devices (either local or remote) and when a user requests to record an upcoming program, the content server can record the program in the active storage device, consuming a portion of the user's allocation in that active storage device. Typically, there are various passive recording options available to users to manage the recording storage space such as "delete at a time", delete oldest recordings, First in First out (FIFO), large size items first etc. These options are set up manually by the user, and are associated per recording on a device and are used by the device to manage the space within itself. There is a finite amount of storage space available in the user device allocated for recording and there are operational costs for service provider involved in claiming additional storage space in the cloud. Due to the easier availability in high quality formats such as HD, 4K and existence of multiple copies of content for different device profiles and content explosion, the storage space can get easily exhausted.

Moreover, the current storage space management systems and policies are passive in nature. They are based on the recording options listed above. The onus is largely on the user to manually set appropriate record options for recording and for storage management. The user can also invoke a service option to choose what programs user wishes to retain vis-à-vis remove from storage either when the user chooses them specifically or if the storage space crosses a threshold value which is near the full capacity of the device. These methods involve user actions for storage space which might get burdensome on user. There can also be variations in storage policies and user experience across CPE devices (local) and cloud/network storage (remote) as well as differences in the devices available to user across time. These can be confusing for user to understand and use the devices optimally.

Also, there is minimal or no intelligence in the recording space management between the local recording storage(s) within the home and cloud storage. For instances, content which are not popularly viewed are not compacted and moved to the cloud, while content that is popular even if it is initially stored in the cloud, are not moved into the local storage for better viewing performance. This impacts the recorded content viewing experience for the end user.

The issues mainly faced in the video recording devices are to manage and utilize the storage space dynamically in each of the video recording devices (CPE devices and cloud devices) thereby improving the overall quality of video viewing experience for the end user.

SUMMARY

Disclosed herein is a method and system for dynamically managing storage of one or more video recording devices.

Accordingly, the present disclosure relates to a method for dynamically managing storage of one or more video recording devices. The method comprises receiving by a recording session management server one or more notifications from each of the one or more video recording devices. The one or more notifications are associated with recording status of an event and the storage space status of each of the one or more video recording devices. The recording session management server also receives one or more policies corresponding to each of the one or more video recording devices. Based on the notifications and the policies, the recording session management server recording server identifies change in status of free space and used space in each of the one or more video recording devices. The method further comprises scheduling at least one of the video recording device for performing one or more actions based on the change in status of free space and used space and one or more event parameters for dynamically managing the storage space of the one or more video recording devices.

Further, the present disclosure discloses a recording session management server for dynamically managing storage of one or more video recording devices. The recording session management server comprises a processor and a memory communicatively coupled to the processor, wherein the memory stores processor-executable instructions, which, on execution, causes the processor to receive one or more notifications from each of the one or more video recording devices. The one or more notifications are associated with recording status of an event and the storage space status of each of the one or more video recording devices. The processor also receives one or more policies corresponding to each of the one or more video recording devices. Based on the notifications and the policies, the processor identifies change in status of free space and used space in each of the one or more video recording devices. Thereafter, the processor schedules at least one of the video recording devices for performing one or more actions based on the change in status of free space and used space and one or more event parameters for dynamically managing the storage space of the one or more video recording devices.

Furthermore, the present disclosure relates to a non-transitory computer readable medium including instructions stored thereon that when processed by at least one processor cause a recording session management server to perform the acts of receiving or more notifications from each of the one or more video recording devices. The one or more notifications are associated with recording status of an event and the storage space status of each of the one or more video recording devices. The recording session management server also receives one or more policies corresponding to each of the one or more video recording devices. Based on the notifications and the policies, the recording session management server recording server identifies change in status of free space and used space in each of the one or more video recording devices. Thereafter, the recording session management server schedules at least one of the video recording devices for performing one or more actions based on the change in status of free space and used space and one or more event parameters for dynamically managing the storage space of the one or more video recording devices.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1A:
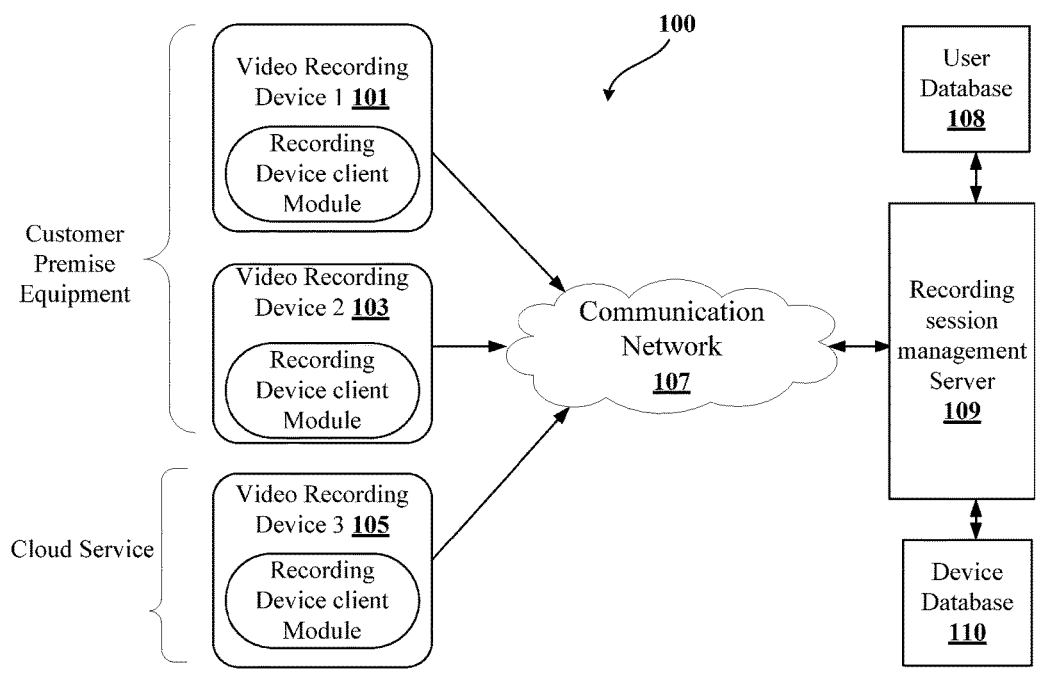
FIG. 1a illustrates an exemplary environment for dynamically managing storage space of one or more video recording devices in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . , a" does not, without more constraints, preclude the existence of other elements or additional elements in the system or method.

The present disclosure relates to a method and system for dynamically managing storage space of one or more video recording devices. The method comprises receiving by recording session management server notifications from each of the one or more video recording devices. The notifications are associated with recording status of an event and the storage space status of each of the one or more video recording devices. Each video recording device is associated with corresponding policies set by a user managing the video recording device. The policies are configured in order to manage the storage space of the video recording devices. The policies may be predefined by the user or changed dynamically based on activities of the user. As an example, the time at which the events should be deleted or archived, the events which are to be deleted or archived, the conditions for deletion such as type of the event, size of the event or access count of the event. Based on these policies the recording of the future events are scheduled. The notifications are stored in a recording database associated with the recording session management server. The recording session management server identifies change in status of free space and used space in each of the one or more video recording devices based on the notifications and the predefined policy associated with each video recording device. If there is change in the status of free space and used space in the video recording device, then the recording session management server schedules the video recording device to perform one or more actions. The recording session management server schedules the video recording device based on the change in the status and one or more event parameters. The one or more actions are deletion of the events, archival of the events or prioritizing the devices for future recording request.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1a illustrates an exemplary environment 100 for dynamically managing storage space of one or more video recording devices in accordance with some embodiments of the present disclosure.

The environment 100 comprises one or more video recording devices, video recording device 1 101, video recording device 2 103 and video recording device 3 105, a communication network 107 and a recording session management server 109. The one or more video recording devices may include but not limited to customer premises equipment (CPE) example set top boxes and cloud based recording services. The recording session management server 109 is associated with a service provider of the video recording devices. In an embodiment, the video recording device 1 101 and the video recording device 2 103 are configured at users/subscribers place and the video recording device 3 105 is a cloud based video recording device. The video recording devices are configured to record one or more events. As an example, the event may refer to any television program. Each recording device is associated with a device identification (ID) number. The one or more events being recorded by each video recording device is also associated with event ID number. The recording session management server 109 is associated with a user database 108 and a device database 110. The user database 108 maintains records of one or more users availing the service from the service provider. As an example user name, user address, term of service etc. The device database 110 maintains records of one or more video recording devices being assigned for each user. Each video recording device comprises a recording client module. The recording client module is configured to transmit one or more notifications to the recording session management server 109. The one or more notifications are associated with recording status of the event and storage status of each of the one or more video recording devices. The notifications associated with the recording status may include, but not limited to, "recording scheduled", "recording started", "recording stopped", "recording failed", "recording complete", "recording deleted", "recording incomplete", "recording view completed", "recording view started" and "recording view paused". The notifications associated with the recording status provide information on whether the event recording has been scheduled, whether the event recording has been started, whether the event recording has been stopped, whether the event recording is failed whether the event recording is incomplete, whether the event recording is complete, whether the event has been deleted, whether the event viewing by the user has been complete, whether the event viewing has been started or whether the event viewing has been pause by the user. The one or more notifications associated with the storage status are "current event projected disk usage", "current event actual disk space", "total available space", "available disk space in the cloud based video recording devices" and "free disk space". the one or more notifications associated with the storage status provide information of storage space of each video recording device i.e the current available space in the video recording device, actual usage of the space in the device after the event recording has been scheduled, total free space in the device and free space in the device. The one or more notifications are continuously provided to the recording session management server 109.

Figure 1B:
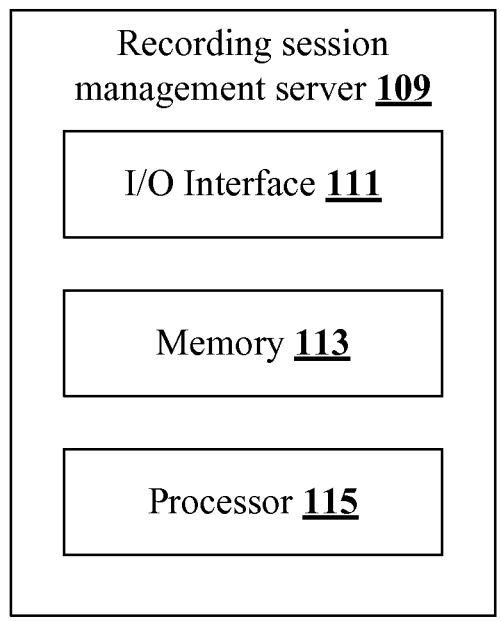
FIG. 1b shows a block diagram illustrating a video recording session management server in accordance with some embodiments of the present disclosure.

FIG. 1b shows a block diagram illustrating a recording session management server 109 in accordance with some embodiments of the present disclosure.

The recording session management server 109 comprises an interface 111, a memory 113 and a processor 115. The I/O interface 111 and the memory 113 are communicatively coupled to the processor 115. The memory 113 stores processor-executable instructions which on execution cause the processor 115 to perform one or more steps. In an embodiment, the input interface 111 is used to receive the notifications from the video recording devices. The notifications associated with each video recording device are stored in the recording database of the memory 113. In an embodiment, the input interface is used to receive policy corresponding to each video recording device. The policies are configured based on inputs received by a user managing the video recording devices. In an embodiment, the policies are also configured based on the inputs received from the service providers. Based on the notifications and the predefined policies, the processor 115 identifies the change in the status of used space and free space in each video recording device. In an embodiment, the processor 115 extracts metadata from the one or more notifications. The metadata includes information associated with the events. As an example, the event may be a television serial. The metadata information may include information of director of the serial, artists of the serial, poster of the serial, name of the serial, series of the serial etc.

As an example, the free space in the video recording device 1 101 is 20 GB and the used space in the video recording device 1 101 is 80 GB. The free space in the video recording device 2 103 is 30 GB and the used space 70 GB. The free space in the video recording device 3 105 is 40 GB and the used space is 60 GB. As an example, the event with event ID 1 is being recorded in the video recording device 1 101. The event with event ID2 is being recorded in the video recording device 2 103 and the event with event ID 3 is being recorded in the video recording device 3 105. While recording the event, the recording client module of the video recording device 1 101 sends notification "recording started" to the recording session management server 109. The recording session management server 109 stores the notification in the recording database. The recording client module of the video recording device 1 101 may send the notification "recording complete" to the recording session management server 109. Since, the recording is complete the storage space in the video recording device 1 101 varies. As an example, the free space after recording the event ID 1 is 10 GB and the used space is 90 GB. The recording client module configured in the video recording device 2 103 sends the notification "recording incomplete" to the recording session management server 109. Since, the recording in incomplete, the storage space in the video recording device 2 103 varies. As an example, the free space after recording the event with event ID 2 is 25 GB and the used space is 75 GB. The recording client module configured in the video recording device 3 105 sends the notification "recording failed" to the recording session management server 109. Since, the recording is failed there will not be any change in the storage space of the video recording device 3 105. The user configures a predefined policy for each of the video recording device. As an example, the predefined policies are associated with deletion of the events and compaction of the events i.e at what point of time the events must be deleted or archived and which events to be deleted to enable recording the new/future events. The processor 115 identifies the change in the status of the free space and the used space in each of the one or more video recording devices. As an example, there is a change in the status of the free space and the used space in the video recording device 1 101 and the video recording device 2 103. The processor 115 identifies the change in the status of the free space and the used space. As an example, the predefined policy associated with by the user. Similarly, as an example, the predefined policy associated with the video recording device 2 103 may be to delete one or more events after a predetermined time and the predefined policy associated with the video recording device 3 105 may be to delete the event whose size is large.

In an embodiment, the processor 115 schedules one or more video recording devices for performing one or more actions based on the change in the status and the one or more event parameters. In this scenario, the processor 115 may prioritize the video recording device 2 103 for recording future events since the free space is more as compared to the free space in the video recording device 1 101. The processor 115 dynamically selects or prioritizes the video recording devices for scheduling the future event recording request. The one or more event parameters may include, but not limited to, access count of the event i.e number of times the recorded event has been viewed by the user, aging of the event i.e to see if the events recorded has been too old, scheduling order of the events i.e the order in which the events should be deleted, viewing pattern of the events by the user i.e to check in which video recording device the user preferable views the recorded video, video format of the recording, duplicate recording of the program i.e if there are duplicate events, priority consideration of the service provider i.e based on decision of the service provider, metadata of the event, accessibility of the recordings on the video recording devices i.e to check if the video recordings has been accessible to the user or not and removal of advertisements on the recorded event wherever permissible.

As an example, the user may view the recorded event with event ID 1 using the video recording device 1 101. Therefore, the future recordings of the event ID 1 may be recorded in the video recording device 1 101 so that it will be easy for the user to access the event. As another example, the user may processor 115 may dynamically schedule the video recording device 1 101 for future event recording request if the event to be recorded has the metadata which matches with the metadata of the event being recorded in the video recording device 1 101. In an embodiment, the processor 115 may schedule at least one video recording device for performing one or more actions based on the change in status of free space and used space and one or more event parameters. The one or more actions may include, but not limited to, deletion of events, archiving of events, rescheduling the event in the one or more video recording devices and identifying the video recording device for recording future events.

Figure 1C:
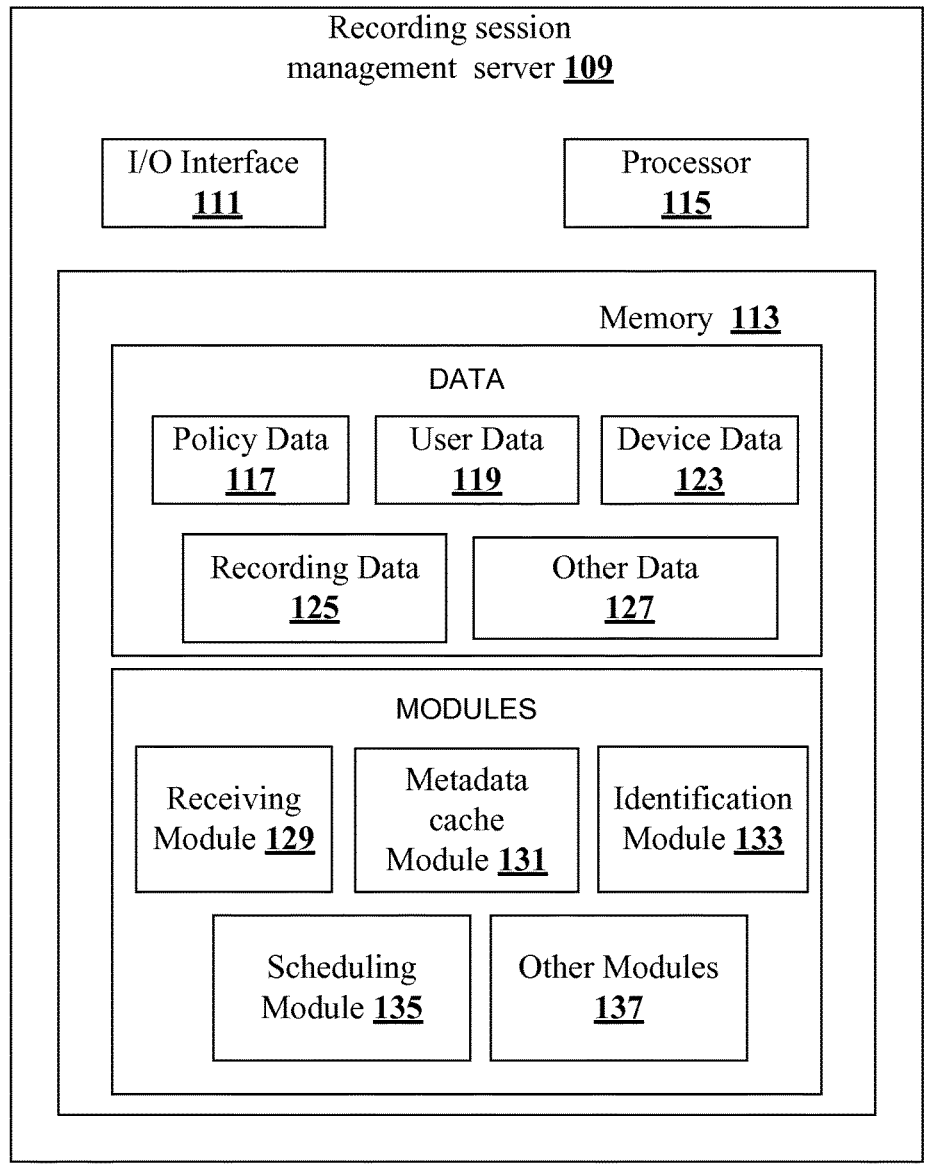
FIG. 1c shows a detailed block diagram illustrating a video recording session management server in accordance with some embodiments of the present disclosure.

FIG. 1c shows a detailed block diagram illustrating a recording session management server 109 in accordance with some embodiments of the present disclosure.

In one implementation, the recording session management server 109 receives input data i.e notifications from one or more video recording devices. As an example, the received input data is stored in a recording database of the memory 113. In an embodiment, the input data includes policy data 117, user data 119, device data 123, recording data 125 and other data 127. In the illustrated FIG. 1c, one or more modules stored in the memory 113 are described herein in detail.

In one embodiment, the data may be stored in the memory 113 in the form of various data structures. Additionally, the aforementioned data can be organized using data models, such as relational or hierarchical data models. The other data 127 may store data, including temporary data and temporary files, generated by modules for performing the various functions of the recording session management server 109.

In an embodiment, the policy data 117 is associated with each of the one or more video recording devices. The user managing the video recording device configures one or more policies for each video recording device. As an example, the user may be a user/subscriber using the video recording device or a service provider. The policies are defined by the user for managing the storage space in the video recording device. As an example, the policy set by the user may be to delete the events in the video recording device when the disk space or the storage space exceeds the predefined threshold storage space value. The other policies may include but not limited to, to delete the events which are not viewed by the user for more than three months, delete the events whose size is large, delete the events after a predetermined time period and archive the events if the storage space is full.

In an embodiment, the user data 119 comprises information of one or more users availing the service from the service provider. The user data 119 is retrieved from the user database 108. The input interface of the recording session management server 109 receives the user data 119 from the user database 108 and stores the user data 119 in the memory 113.

In an embodiment, the device data 123 comprises information of one or more video recording devices configured for each user/subscriber. The device data 123 also includes information of type of the video recording device, device ID and the storage capacity of the video recording device. The device data 123 is retrieved from the device database 110. The input interface of the recording session management server 109 receives the device data 123 from the device database 110 and stores in the memory 113.

In an embodiment, the recording data 125 comprise information of one or more events being recorded in each of the video recording device. Each video recording device records one or more events and sends notification to the recording session management server 109. The recording session management server 109 stores the information of each event being recorded in each video recording device. The date and time which the events are recorded and also information about storage space in each of the video recording devices. The recording session management server 109 also extracts metadata information of each event being recorded in each video recording device.

In an embodiment, the data stored in the memory 113 are processed by the modules of the recording session management server 109. The modules may be stored within the memory 113 as shown in FIG. 1c. In an example, the modules, communicatively coupled to the processor 115, may also be present outside the memory 113.

In one implementation, the modules may include, for example, a receiving module 129, a metadata cache module 131, an identification module 133, a scheduling module 135 and other modules 137. The other modules 137 may be used to perform various miscellaneous functionalities of the recording session management server 109. It will be appreciated that such aforementioned modules may be represented as a single module or a combination of different modules.

In an embodiment, the receiving module 129 is configured to receive one or more notifications from each of the one or more video recording devices. As an example, one or more video recording devices are configured inside user's home and one or more video recording devices may be a cloud based recoding service provided to the user. Each video recording device is associated with an identification (ID) number. The video recording devices are configured to record one or more events and provide notifications to the recording session management server 109. The notifications are associated with the recording status of the events and the storage status of the video recording device. The receiving module 129 receives the notifications from each video recording device and stores in the memory 113.

Upon receiving the notifications, the recording session management server 109 performs mapping of the notifications with the user data 119 and the device data 123. In the exemplary embodiment illustrated in FIG. 1, the video recording device 1 101, the video recording device 2 103 and the video recording device 3 105 is configured for user 1. Therefore, the notifications received from these devices are mapped in the recording database for the user 1. In an embodiment, the information associated with mapping may be provided to the video recording devices through one or more interfaces which includes, but not limited to, HTTP-JSON, SOAP-RPC and XML. Based on the received notifications, the recording session management server 109 identifies the active events being recorded in each video recording device at one or more time intervals. In an embodiment, the recording session management server 109 receives the information associated with one or more policies configured for each video recording device by a user. The policies provide information for deleting or archiving the events in each video recording device.

In an embodiment, the metadata cache module 131 extracts metadata information based on the received notifications from each video recording device. The metadata information is associated with each event being recorded or stored in the video recording device. As an example, the event may be a television serial. The metadata information may include, name of the director, name of the artists in the serial and series number of the serial. Based on the metadata information, the recording session management server 109 schedules one of the video recording devices for performing one or more actions. As an example, the event with event ID 1 may be recorded in the video recording device 1 101. When the one or more series of the same event has to be recorded in future, then the based on the metadata information, the recording session management server 109 identifies that the event with the event ID 1 has been recorded in the video recording device 1 101 and therefore, the one or more series of the same event will also be recorded in the video recording device 1 101 for easy access by the user.

In an embodiment, the identification module 133 identifies the change in the status of the free space and used space in each video recording device based on the notifications and the predefined policies. The change in the status of free space and used space is identified in each video recording device. The free space and used space in each of the one or more video recording devices is recorded by the recording session management server 109 for managing the storage space optimally among the video recording devices.

In an embodiment, the scheduling module 135 is configured to schedule at least one video recording device for performing one or more actions. As illustrated in FIG. 1, there is change in status of the free space and used space in the video recording device 1 101 and the video recording device 2 103. The recording session management server 109 schedules the recording of the future events based on the free space availability of the video recording devices. As an example, the future event may be associated with the event ID 1. Therefore, the recording session management server 109 schedules the video recording device 1 101 to perform one or more actions for recording the future event associated with the event ID 1. The one or more actions may be related to deleting the events or archiving the events in the video recording device 1 101. As an example, the action scheduled for the video recording device 1 101 may be to delete one or more events in the video recording device 1 101 which are not viewed by the user for more than 3 months. Therefore, the video recording device 1 101 deletes the one or more events. Thereafter, the video recording device 1 101 may be used for recording the future events associated with the event ID 1. The recording session management server 109 also estimates the size of the event to be recorded. If the size exceeds the free space size in the video recording device 1 101, then the recording session management server 109 may schedule the video recording device 2 103 to record the future events.

Figure 2:
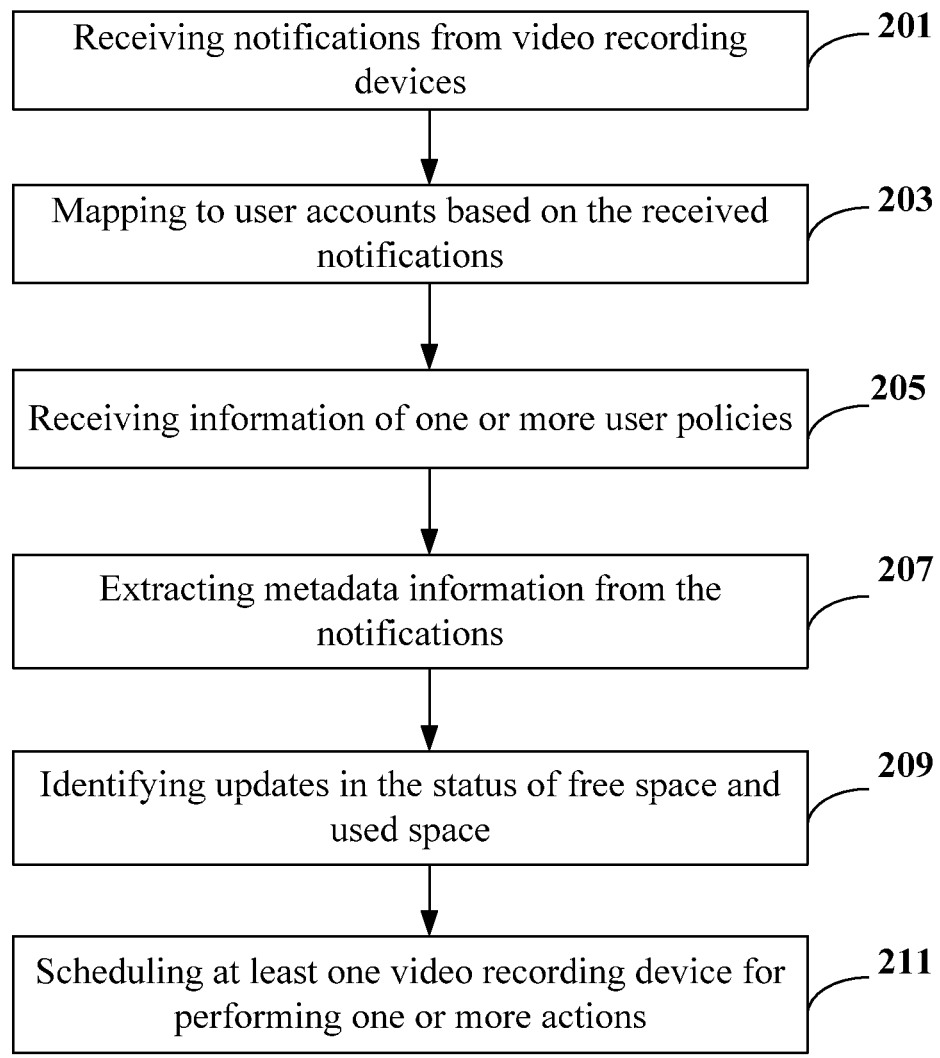
FIG. 2 illustrates a flowchart showing method for dynamically managing storage space of one or more video recording devices in accordance with some embodiments of the present disclosure.

FIG. 2 illustrates a flowchart showing method 200 for dynamically managing storage space of one or more video recording devices in accordance with some embodiments of the present disclosure.

As illustrated in FIG. 2, the method 200 comprises one or more blocks for dynamically managing storage space of one or more video recording devices using a recording session management server 109. The method 200 may be described in the general context of computer executable instructions. Generally, computer executable instructions can include routines, programs, objects, components, data structures, procedures, modules, and functions, which perform particular functions or implement particular abstract data types.

The order in which the method 200 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 201, one or more notifications are received from each of the one or more video recording devices. The one or more video recording devices are associated with a service provider for recording and storing events. The one or more notifications are associated with recording status of the events and storage space status. The recording status refers to event recording status and recording view status of the events. The event recording status may include information of whether the event has been scheduled or not, whether event recording has been started or not, whether the event recording has been stopped or not, whether the event recording has been failed, whether the event recording has been completed, whether the event recording has been deleted. The recording view status may include information of whether the event viewing has been completed or not, whether viewing of the event has been started or not or whether the viewing of the recording has been paused or not. The notifications are continuously sent to the recording session management server 109 and the notifications are updated in the recording database.

At block 203, mapping of the notifications with the user account is performed. Based on the received notifications the recording session management server 109 maps the notifications to the associated user. The recoding server 109 maps the notifications received from the video recording devices to the user data 119 stored in the recording database.

At block 205, one or more policies configured for each video recording device is provided to the recording session management server 109. The one or more policies are configured by a user of the video recording devices. The configured policies may be changed based on activities of the user. Based on the policies the video recording device 109 will either delete the events or archive the events for recording/storing the future events.

At block 207, metadata information associated with the events is extracted. In an embodiment, the recording session management server 109 extracts the metadata from based on the notifications received from the video recording devices. In another embodiment, the metadata information may be received from an event metadata service like Electronic program Guide (EPG) services and stores the metadata information in the recording database.

At block 209, the recording session management server 109 identifies change in status of free space and used space in each video recording device. As an example, after recording a particular event there might be change in the status of the free space and the used space. Since the event has been recorded, the free space would have become less and the used space would have become more. The change in the status is identified by the recording session management server 109 and updates the information in the recording database. Since there is change in the status, the recording session management server 109 may schedule recording of the future events optimally in the video recording devices where there availability of free space.

At block 211, the recording session management server 109 schedules the video recording device to perform one or more actions based on the change in the status of free space and used space and one or more event parameters. The event parameters may be access count of the event, aging of the event, scheduling order of the events, viewing pattern of the events by the user, video format of the recording, duplicate recording of the program, priority consideration of the service provider, accessibility of the recordings on the video recording devices and removal of advertisements on the recorded event wherever permissible. The one or more actions may be to delete the one or more events, archive the one or more events or even prioritize the video recording devices for recording the future events.

Computer System

Figure 3:
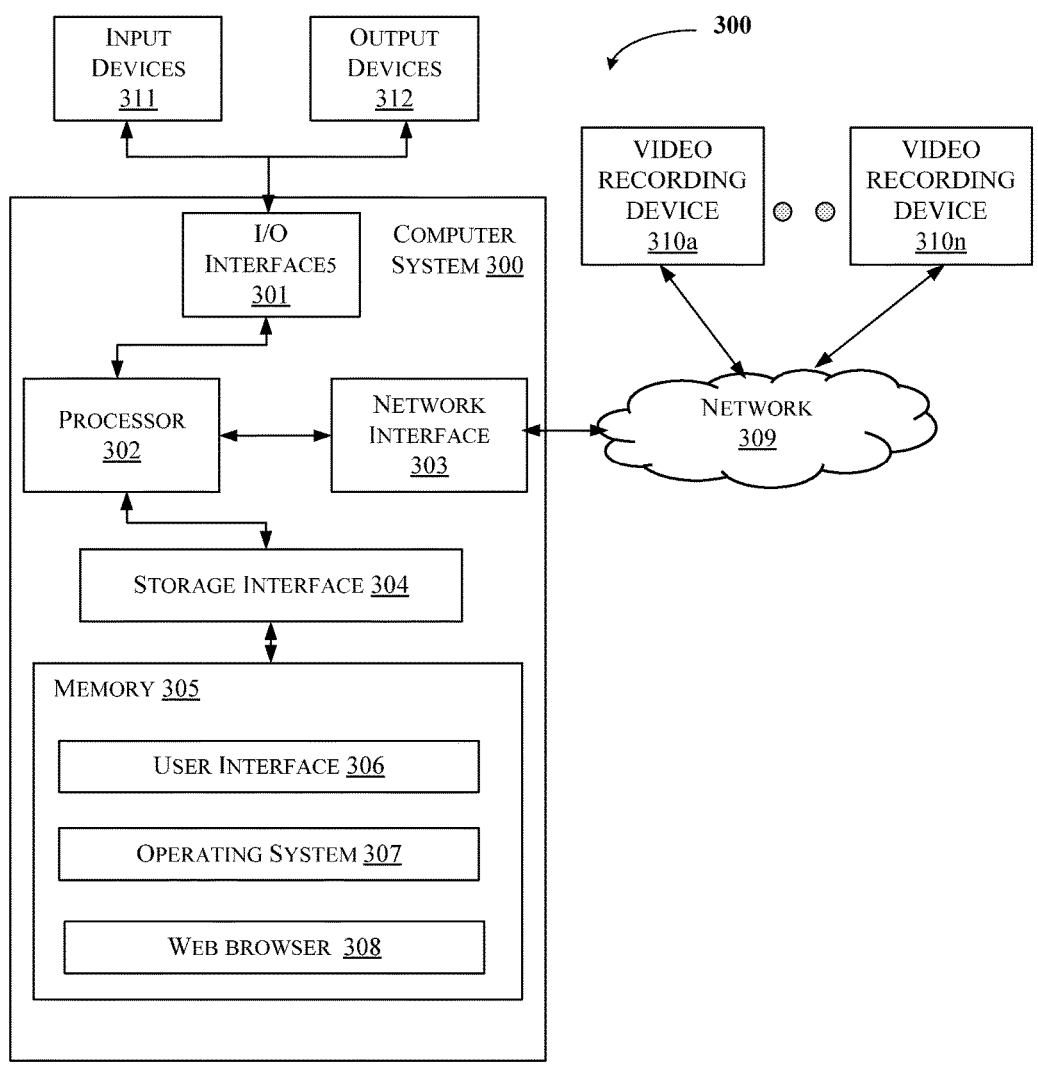
FIG. 3 illustrates a block diagram of an exemplary computer system for implementing embodiments consistent with the present disclosure.

FIG. 3 illustrates a block diagram of an exemplary computer system 300 for implementing embodiments consistent with the present invention. In an embodiment, the computer system 400 is used for dynamically managing storage space of video recording devices using a recording session management server 109. The computer system 300 may comprise a central processing unit ("CPU" or "processor") 302. The processor 302 may comprise at least one data processor for executing program components for executing user- or system-generated business processes. A user may include a person, a person using a device such as such as those included in this invention, or such a device itself. The processor 302 may include specialized processing units such as integrated system (bus) controllers, memory management control units, floating point units, graphics processing units, digital signal processing units, etc.

The processor 302 may be disposed in communication with one or more input/output (I/O) devices (311 and 312) via I/O interface 301. The I/O interface 301 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 301, the computer system 300 may communicate with one or more I/O devices (311 and 312).

In some embodiments, the processor 302 may be disposed in communication with a communication network 309 via a network interface 303. The network interface 303 may communicate with the communication network 309. The network interface 303 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 303 and the communication network 309, the computer system 300 may communicate with one or more user devices 310 (a, . . . , n). The communication network 309 can be implemented as one of the different types of networks, such as intranet or Local Area Network (LAN) and such within the organization. The communication network 309 may either be a dedicated network or a shared network, which represents an association of the different types of networks that use a variety of protocols, for example, Hypertext Transfer Protocol (HTTP), Transmission Control Protocol/ Internet Protocol (TCP/IP), Wireless Application Protocol (WAP), etc., to communicate with each other. Further, the communication network 309 may include a variety of network devices, including routers, bridges, servers, computing devices, storage devices, etc. The one or more user devices 310 (a, . . . , n) may include, without limitation, personal computer(s), mobile devices such as cellular telephones, smartphones, tablet computers, eBook readers, laptop computers, notebooks, gaming consoles, or the like.

In some embodiments, the processor 302 may be disposed in communication with a memory 305 (e.g., RAM, ROM, etc. not shown in FIG. 3) via a storage interface 304. The storage interface 304 may connect to memory 305 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 305 may store a collection of program or database components, including, without limitation, user interface application 306, an operating system 307, web server 308 etc. In some embodiments, computer system 300 may store user/application data 306, such as the data, variables, records, etc. as described in this invention. Such databases may be implemented as fault-tolerant, relational, scalable, secure databases such as Oracle or Sybase.

The operating system 307 may facilitate resource management and operation of the computer system 300. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), International Business Machines (IBM) OS/2, Microsoft Windows (XP, Vista/ 7/8, etc.), Apple iOS, Google Android, Blackberry Operating System (OS), or the like. User interface 306 may facilitate display, execution, interaction, manipulation, or operation of program components through textual or graphical facilities. For example, user interfaces may provide computer interaction interface elements on a display system operatively connected to the computer system 300, such as cursors, icons, check boxes, menus, scrollers, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 300 may implement a web browser 308 stored program component. The web browser may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 300 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 300 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the embodiment of the present disclosure are illustrated herein.

In an embodiment, the present disclosure provides optimal usage of the video recording device for recording and storing events.

In an embodiment, the present disclosure provides a method to dynamically manage the storage space in the video recording devices wherein the video recording devices includes customer premises equipment and cloud based video recording services.

The present disclosure provides optimal usage of storage space for storing recordings by identifying available and ongoing recorded event across the video recording devices.

The present disclosure provides a method for identifying which recordings have to be deleted or archived or compacted based on the event, video recording device and the account usage of the user.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Referral Numerals:

| Reference Number | Description |
| --- | --- |
| 100 | Environment |
| 101 | Video Recording device 1 |
| 103 | Video recording device 2 |
| 105 | Video recording device 3 |
| 107 | Communication network |
| 109 | Recording session management server |
| 111 | I/O interface |
| 113 | Memory |
| 115 | Processor |

-continued

Referral Numerals:

| Reference Number | Description |
| --- | --- |
| 117 | Policy Data |
| 119 | User Data |
| 123 | Device Data |
| 125 | Recording Data |
| 127 | Other Data |
| 129 | Receiving Module |
| 131 | Metadata Cache Module |
| 133 | Identification Module |
| 135 | Scheduling Module |
| 137 | Other Modules |

What is claimed is:

1. A method for dynamically managing storage space of one or more video recording devices, the method comprising:
receiving, by a recording session management server, one or more notifications from each of the one or more video recording devices, wherein the one or more notifications are associated with recording status of an event and the storage space status of each of the one or more video recording devices;
receiving, by the recording session management server, one or more policies corresponding to each of the one or more video recording devices;
identifying, by the recording session management server, change in status of free space and used space in each of the one or more video recording devices based on the one or more notifications and the one or more policies; and
scheduling, by the recording session management server, at least one of the video recording device for performing one or more actions based on the change in status of free space and used space and one or more event parameters for dynamically managing the storage space of the one or more video recording devices.

2. The method as claimed in claim 1, wherein the one or more video recording devices comprises cloud based video recording devices and one or more customer premise equipment's.

3. The method as claimed in claim 1, wherein the one or more notifications received from each of the one or more video recording devices is stored in a recording database of the recording session management server.

4. The method as claimed in claim 1, wherein the storage space status comprises at least one of total available space in the video recording device, projected usage of the video recording device for the event, actual usage of the video recording device for the event, free space in the video recording device and available space in the cloud based video recording devices.

5. The method as claimed in claim 1, wherein the one or more policies is based on at least one of inputs received from a user managing the video recording devices and inputs derived dynamically based on activities of the user.

6. The method as claimed in claim 1, wherein the one or more notifications received from each of the one or more video recording devices are associated to a user account based on identification (ID) number of each of the one or more video recording devices.

7. The method as claimed in claim 1, wherein receiving the one or more notifications further comprises identifying metadata information associated with the event.

8. The method as claimed in claim 1, wherein the one or more actions comprises at least one of deletion of events, archiving of events, rescheduling the event in the one or more video recording devices and identifying the video recording device for recording future events.

9. The method as claimed in claim 1, wherein the one or more actions are performed at time intervals configured by the recording server.

10. A recording session management server comprising:
a processor; and
a memory communicatively coupled to the processor, wherein the memory stores processor-executable instructions, which, on execution, causes the processor to:
receive one or more notifications from each of the one or more video recording devices, wherein the one or more notifications are associated with recording status of an event and the storage space status of each of the one or more video recording devices;
receive one or more policies corresponding to each of the one or more video recording devices;
identify change in status of free space and used space in each of the one or more video recording devices based on the one or more notifications and the one or more policies; and
schedule at least one of the video recording device for performing one or more actions based on the change in status of free space and used space and one or more event parameters for dynamically managing the storage space of the one or more video recording devices.

11. The recording session management server as claimed in claim 10, wherein the instructions further cause the processor to store the one or more notifications received from each of the one or more video recording devices in a recording database of the recording server.

12. The recording session management server as claimed in claim 10, wherein the instructions further cause the processor to associate the one or more notifications received from each of the one or more video recording devices to a user account based on identification (ID) number of each of the one or more video recording devices.

13. The recording session management server as claimed in claim information associated with the event based on the received one or more notifications.

14. The recording session management server as claimed in claim 10, wherein the instructions further cause the processor to configure the policies based on at least one of inputs received from a user managing the video recording devices and inputs derived dynamically based on activities of the user.

15. A non-transitory computer readable medium including instructions stored thereon that when processed by at least one processor cause a recording session management server to perform operations comprising:
receiving one or more notifications from each of the one or more video recording devices, wherein the one or more notifications are associated with recording status of an event and the storage space status of each of the one or more video recording devices;
receiving one or more policies corresponding to each of the one or more video recording devices;
identifying change in status of free space and used space in each of the one or more video recording devices based on the one or more notifications and the one or more policies; and
scheduling at least one of the video recording device for performing one or more actions based on the change in status of free space and used space and one or more event parameters for dynamically managing the storage space of the one or more video recording devices.

\* \* \* \* \*